(12) United States Patent
Arai et al.

(10) Patent No.: US 10,036,078 B2
(45) Date of Patent: Jul. 31, 2018

(54) LOW ALLOY OIL WELL STEEL PIPE AND METHOD FOR MANUFACTURING SAME

(71) Applicant: NIPPON STEEL & SUMITOMO METAL CORPORATION, Tokyo (JP)

(72) Inventors: Yuji Arai, Amagasaki (JP); Tomohiko Omura, Kishiwada (JP); Keiichi Kondo, Wakayama (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 187 days.

(21) Appl. No.: 14/905,311

(22) PCT Filed: Jul. 23, 2014

(86) PCT No.: PCT/JP2014/003858
§ 371 (c)(1),
(2) Date: Jan. 15, 2016

(87) PCT Pub. No.: WO2015/011917
PCT Pub. Date: Jan. 29, 2015

(65) Prior Publication Data
US 2016/0160307 A1    Jun. 9, 2016

(30) Foreign Application Priority Data

Jul. 26, 2013   (JP) ................................. 2013-155674

(51) Int. Cl.
*C22C 38/20* (2006.01)
*C22C 38/22* (2006.01)
(Continued)

(52) U.S. Cl.
CPC ................ *C21D 9/085* (2013.01); *B21B 3/00* (2013.01); *C21D 1/56* (2013.01); *C21D 6/002* (2013.01);
(Continued)

(58) Field of Classification Search
None
See application file for complete search history.

(56) References Cited

U.S. PATENT DOCUMENTS

2012/0186704 A1*   7/2012   Eguchi ..................... C21D 9/14
148/500

FOREIGN PATENT DOCUMENTS

| CA | 2766028 | 12/2010 |
| EP | 1 862 561 | 12/2007 |

(Continued)

OTHER PUBLICATIONS

Machine-English translation of JP 01-159318, Kataoka Yoshihiro et al., Jun. 22, 1989.*

*Primary Examiner* — Deborah Yee
(74) *Attorney, Agent, or Firm* — Clark & Brody

(57) ABSTRACT

Low-alloy oil-well steel pipe includes a composition consisting, in mass %, of C: 0.40 to 0.65%, Si: 0.05 to 0.50%, Mn: 0.10 to 1.00%, P: 0.020% or less, S: 0.0020% or less, Cu: 0.15% or less, Cr: 0.40 to 1.50%, Mo: 0.50 to 2.50%, V: 0.05 to 0.25%, Ti: 0 to less than 0.01%, Nb: 0.01 to 0.2%, sol. Al: 0.010 to 0.100%, N: 0.006% or less, B: 0 to 0.0015%, and Ca: 0 to 0.003%, the balance being Fe and impurities. The structure has tempered martensite and 0 to less than 2% volume ratio of retained austenite. A grain size number of prior-austenite grain in the structure is 9.0 or more. An equivalent circular diameter of a sub-structure surrounded by a boundary having a crystal orientation difference of 15° or more from a packet boundary, a block boundary and a lath boundary is 3 μm or less for the tempered martensite.

3 Claims, 4 Drawing Sheets

(51) Int. Cl.
*C22C 38/24* (2006.01)
*C22C 38/26* (2006.01)
*C22C 38/28* (2006.01)
*C22C 38/32* (2006.01)
*C21D 9/08* (2006.01)
*C21D 8/10* (2006.01)
*B21B 3/00* (2006.01)
*C22C 38/00* (2006.01)
*C21D 1/56* (2006.01)
*C21D 6/00* (2006.01)
*C21D 7/13* (2006.01)
*C22C 38/02* (2006.01)
*C22C 38/04* (2006.01)
*C22C 38/06* (2006.01)
*B21B 19/04* (2006.01)
*B21B 19/10* (2006.01)

(52) U.S. Cl.
CPC ............ *C21D 6/005* (2013.01); *C21D 6/008* (2013.01); *C21D 7/13* (2013.01); *C21D 8/105* (2013.01); *C21D 9/08* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *B21B 19/04* (2013.01); *B21B 19/10* (2013.01); *C21D 2211/008* (2013.01)

(56) References Cited

FOREIGN PATENT DOCUMENTS

| | | | | |
|---|---|---|---|---|
| EP | 1 876 254 | 1/2008 | | |
| JP | 59-232220 | 12/1984 | | |
| JP | 62-253720 | 11/1987 | | |
| JP | 01-159318 | * 6/1989 | ............... | C21D 8/02 |
| JP | 6-322478 | 11/1994 | | |
| JP | 8-311551 | 11/1996 | | |
| JP | 11-335731 | 12/1999 | | |
| JP | 2000-119798 | 4/2000 | | |
| JP | 2000-178682 | 6/2000 | | |
| JP | 2000-256783 | 9/2000 | | |
| JP | 2000-297344 | 10/2000 | | |
| JP | 2005-350754 | 12/2005 | | |
| JP | 2006-265657 | 10/2006 | | |
| WO | 2010/100020 | 9/2010 | | |

* cited by examiner

LOW ALLOY OIL WELL STEEL PIPE AND METHOD FOR MANUFACTURING SAME

TECHNICAL FIELD

The present invention relates to an oil well steel pipe and a method for manufacturing the same, and more specifically relates to a low alloy oil well steel pipe used for, e.g., a casing or a tubing for an oil well or a gas well and a method for manufacturing the same.

BACKGROUND ART

With increase in depth of oil wells and gas wells (hereinafter, the oil wells and the gas wells are collectively and simply referred to as "oil wells"), there is a need for increase in strength of oil well steel pipes. Conventionally, 80 ksi grade (yield stress of 80 to 95 ksi, that is, 551 to 654 MPa) and 95 ksi grade (yield stress of 95 to 110 ksi, that is, 654 to 758 MPa) oil-well steel pipe have widely been used. However, recently, 110 ksi grade (yield stress of 110 to 125 ksi, that is, 758 to 862 MPa) oil well steel pipes are put into use.

Many of the recently-developed deep wells contain hydrogen sulfide, which is corrosive. Thus, oil well steel pipes are required to have not only high strength but also sulfide stress cracking resistance (hereinafter referred to as SSC resistance).

As a measure to improve the SSC resistance of a conventional 95 to 110 ksi grade oil well steel pipe, known methods include cleaning the steel and making the steel structure finer. For example, Japanese Patent Application Publication No. 62-253720 proposes the method for improving the SSC resistance by reducing impurity elements such as Mn and P. Japanese Patent Application Publication No. 59-232220 proposes the method for improving the SSC resistance by performing quenching twice for grain refining.

In response to the need for increase in strength of the oil well steel pipes, recently, 125 ksi grade (yield stress of 862 to 965 MPa) oil well steel pipes are put into use. Furthermore, there is an increasing need for oil well steel pipes having yield strength of 140 ksi (yield stress of 965 MPa) or more.

Sulfide stress cracking (SSC) is more liable to occur as the strength is higher. Therefore, oil well steel pipes of 140 ksi or more need to have further improved SSC resistance, compared to the conventional oil-well steel pipes of the 95 ksi class, the 110 ksi grade and the 125 ksi grade.

Japanese Patent Application Publication Nos. 6-322478, 8-311551, 11-335731, 2000-178682, 2000-256783, 2000-297344, 2000-119798, 2005-350754 and 2006-265657 each propose a measure to improve the SSC resistance of a steel for a high-strength oil well pipe.

Japanese Patent Application Publication No. 6-322478 proposes the method for improving the SSC resistance of a 125 ksi grade steel product by providing a finer steel structure by heat treatment using induction heating. Japanese Patent Application Publication No. 8-311551 proposes the method for improving the SSC resistance of a steel pipe of the 110 to 140 ksi grades by enhancing the hardenability using the direct quenching process and increasing the tempering temperature. Japanese Patent Application Publication No. 11-335731 proposes the method for improving the SSC resistance of a low alloy steel of the 110 to 140 ksi grades by making adjustment to provide optimum alloy chemical composition. Japanese Patent Application Publication Nos. 2000-178682, 2000-256783 and 2000-297344 each propose the method for improving the SSC resistance of a steel for a low alloy oil well pipe of the 110 to 140 ksi grades by controlling the shapes of carbides. Japanese Patent Application Publication No. 2000-119798 proposes the method for delaying a time of occurrence of SSC in a steel product of the 110 to 125 ksi grades by precipitation of a large amount of fine V carbides. Japanese Patent Application Publication No. 2005-350754 proposes the method for improving the SSC resistance of an oil well steel pipe of the 125 ksi grade or more by controlling the dislocation density and the hydrogen diffusion coefficient to desired values. Japanese Patent Application Publication No. 2006-265657 proposes the method for improving the SSC resistance of a steel for an oil well pipe of the 125 ksi grade or more by production of a single-phase bainite structure, which is provided by containing a large C content in the steel, and during water cooling, stopping the water cooling at 400 to 600° C. and performing isothermal transformation heat treatment (austemper treatment) at 400 to 600° C.

PRIOR ART DOCUMENTS

Patent Documents

Patent Document 1: Japanese Patent Application Publication No. 62-253720
Patent Document 2: Japanese Patent Application Publication No. 59-232220
Patent Document 3: Japanese Patent Application Publication No. 6-322478
Patent Document 4: Japanese Patent Application Publication No. 8-311551
Patent Document 5: Japanese Patent Application Publication No. 11-335731
Patent Document 6: Japanese Patent Application Publication No. 2000-178682
Patent Document 7: Japanese Patent Application Publication No. 2000-256783
Patent Document 8: Japanese Patent Application Publication No. 2000-297344
Patent Document 9: Japanese Patent Application Publication No. 2000-119798
Patent Document 10: Japanese Patent Application Publication No. 2005-350754
Patent Document 11: Japanese Patent Application Publication No. 2006-265657

SUMMARY OF INVENTION

However, any of the techniques disclosed in the patent documents may fail to provide an oil-well steel pipe that has a yield strength of 140 ksi or more and stably exhibits excellent SSC resistance.

It is an object of the present invention to provide a low-alloy oil-well steel pipe that has a yield stress of 965 MPa (140 ksi) or more and stably exhibits excellent SSC resistance.

The low-alloy oil-well steel pipe according to the present invention includes a chemical composition consisting, in mass %, of C: 0.40 to 0.65%, Si: 0.05 to 0.50%, Mn: 0.10 to 1.00%, P: 0.020% or less, S: 0.0020% or less, Cu: 0.15% or less, Cr: 0.40 to 1.50%, Mo: 0.50 to 2.50%, V: 0.05 to 0.25%, Ti: 0 to less than 0.01%, Nb: 0.01 to 0.2%, sol. Al: 0.010 to 0.100%, N: 0.006% or less, B: 0 to 0.0015%, and Ca: 0 to 0.003%, the balance being Fe and impurities, and a structure consisting of tempered martensite and 0 to less than 2% in volume ratio of retained austenite. A grain size number of a prior-austenite grain in the structure is 9.0 or more, and in the tempered martensite, an equivalent circular diameter of a sub-structure surrounded by a boundary having a crystal orientation difference of 15° or more from among a packet boundary, a block boundary and a lath boundary is 3 μm or less.

The method for manufacturing a low-alloy oil-well steel pipe according to the present invention includes a hot working step of hot-working a starting material having the above-described chemical composition to form a hollow shell, a final quenching step of subjecting the hollow shell to quenching in which a cooling rate when a temperature of the hollow shell is between 500° C. and 100° C. is set to 1° C./s to less than 15° C./s and the temperature of the hollow shell at which cooling is stopped is set to 100° C. or less, and a step of tempering the quenched hollow shell.

The low-alloy oil-well steel pipe according to the present invention has yield stress of 965 MPa (140 ksi) or more and stably exhibits excellent SSC resistance.

DESCRIPTION OF EMBODIMENTS

Figure 1:
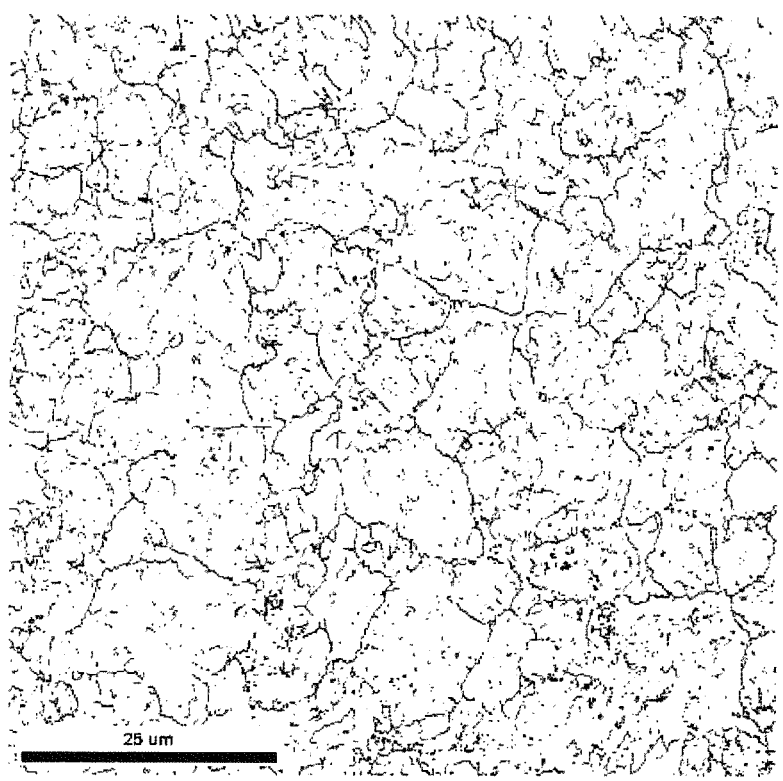
FIG. 1 illustrates a prior-austenite grain boundary map of a structure whose sub-structures have a grain diameter of 2.6 μm.

An embodiment of the present invention will be described in detail below. In the present description, "%" means "mass %" unless otherwise noted.

The present inventors researched and studied the SSC resistances of low-alloy oil-well steel pipes having yield strength of 965 MPa or more and obtained the following findings.

(1) In order to provide a high-strength low-alloy oil-well steel pipe that stably exhibits excellent SSC resistance, it is effective to use a steel having a high C content of 0.40% or more. Reasons of this are indicated below.

Generally, a low-alloy oil-well steel pipe is adjusted to have a metal structure that mainly includes tempered martensite, by quenching and tempering after hot rolling. Conventionally, it is believed that as the carbides are more spheroidized in the tempering process, the SSC resistance is more improved. The precipitating carbides mainly include cementite, and the rest of the carbides include alloy carbides (Mo carbides, V carbides and Nb carbides, and Ti carbides if Ti is contained). If carbides precipitate on a grain boundary, as the carbides are flatter, SSC is more liable to occur with these carbides as the starting point. In other words, as the carbides are closer to a spherical shape, the carbides on the grain boundary become less likely to cause SSC, and thus the SSC resistance is enhanced. Therefore, in order to improve the SSC resistance, spheroidizing of carbides, in particular, cementite is desirable.

It is known that carbides can be spheroidized by tempering at a maximum possible temperature. However, high-temperature tempering decreases dislocation density of the inside of the steel pipe. The dislocation density decrease itself is effective for SSC resistance enhancement. However, in general, it may cause a decrease in strength. A dislocation serves as a trap site for hydrogen, and thus, if the dislocation density is high, it is difficult to stably provide excellent SSC resistance. Containing alloy elements that enhance the temper softening resistance such as Mo and V is effectively for suppression of the strength decrease caused by high-temperature tempering. However, such effect has a limit.

If 0.40% or more of C is contained, spheroidizing of carbides, in particular, cementite, is accelerated, and furthermore, many carbides precipitate in the steel. Thus, the steel can be reinforced by precipitation strengthening, independent of the dislocation density. In other words, tempering a low-alloy steel having a high C content under proper tempering conditions enables expectation of ensuring of strength by precipitation strengthening resulting from precipitation of many carbides and ensuring of SSC resistance resulting from spheroidizing of the carbides.

According to the above, if a C content is 0.40% or more, a large amount of carbides precipitate and disperse, and thus, the strength of the steel can further be enhanced by precipitation strengthening, independent of the dislocation density. Furthermore, if a C content is 0.40% or more, the concentration of the alloy elements in the cementite decreases and the cementite is spheroidized. Thus, the SSC resistance is stabilized while a high strength is achieved. Furthermore, if a C content is 0.40% or more, the volume ratio of martensite in the structure increases. As the volume ratio of martensite is higher, the dislocation density after tempering more decreases, and thus the SSC resistance is also stabilized.

In order to achieve yield strength of 965 MPa or more, it is preferable that the structure substantially consist of single-phase tempered martensite; and the volume ratio of retained austenite to the entire structure (hereinafter referred to as the volume ratio of retained austenite) (%) be as low as possible. If the structure contains any phase other than tempered martensite (e.g., bainite), the aforementioned high strength cannot be achieved. Also, if the volume ratio of retained austenite is high, the strength varies. Accordingly, the structure of a low-alloy oil-well steel pipe needs to be a structure consisting of tempered martensite and 0 to less than 2% in volume ratio of retained austenite.

(2) In order to provide a low-alloy oil-well steel pipe that has a high strength of 965 MPa or more and stably exhibits excellent SSC resistance, the tempered martensite structure is made finer. Tempered martensite contains a plurality of prior-austenite grains, a plurality of packets, a plurality of blocks and a plurality of laths. More specifically, tempered martensite contains a plurality of prior-austenite grains, and each prior-austenite grain includes a plurality of packets. Each packet includes a plurality of plate-like blocks, and each block includes a plurality of laths.

From among the regions of tempered martensite defined by the boundaries such as the packet boundaries, the block boundaries and the lath boundaries, a region surrounded by a high-angle grain boundary is defined as "sub-structure." Furthermore, from among the aforementioned respective boundaries (the packet boundaries, the block boundaries and the lath boundaries), boundaries having a crystal orientation difference of 15° or more are defined as "high-angle grain boundaries."

As the prior-austenite grains and the sub-structures of a low-alloy oil-well steel pipe having yield strength of 965 MPa or more are finer, excellent SSC resistance can stably be provided. More specifically, if the grain size number of the prior-austenite grains that conforms to ASTM E112 is 9.0 or more and the equivalent circular diameter of the sub-structures is 3 μm or less, a low-alloy oil-well steel pipe that has high strength of 965 MPa or more and stably exhibits excellent SSC resistance can be provided.

(3) In order to make the equivalent circular diameter of the sub-structures be 3 μm or less, preferably, the final quenching conditions during the manufacturing process are controlled. More specifically, in the final quenching, the cooling rate for a hollow shell temperature range of 500 to 100° C. is set to 1° C./s or more, and the hollow shell temperature at which the cooling is stopped (hereinafter referred to as cooling stop temperature) is set to 100° C. or less.

(4) Before the final quenching, intermediate heat treatment may be performed. More specifically, the hollow shell subjected to hot rolling is soaked at a point that is an $A_1$ point or more (an $A_{c1}$ point or an $A_{r1}$ point). In this case, since austenite is produced in the structure, the prior-austenite grains are further refined, providing excellent SSC resistance.

Based on the above findings, the present inventors have completed the following invention.

The low-alloy oil-well steel pipe according to the present invention includes a chemical composition consisting, in mass %, of C: 0.40 to 0.65%, Si: 0.05 to 0.50%, Mn: 0.10 to 1.00%, P: 0.020% or less, S: 0.0020% or less, Cu: 0.15% or less, Cr: 0.40 to 1.50%, Mo: 0.50 to 2.50%, V: 0.05 to 0.25%, Ti: 0 to less than 0.01%, Nb: 0.01 to 0.2%, sol. Al: 0.010 to 0.100%, N: 0.006% or less, B: 0 to 0.0015%, and Ca: 0 to 0.003%, the balance being Fe and impurities, and a structure consisting of tempered martensite and 0 to less than 2% in volume ratio of retained austenite, and a grain size number of a prior-austenite grain in the structure is 9.0 or more, and in the tempered martensite, an equivalent circular diameter of a sub-structure surrounded by a boundary having a crystal orientation difference of 15° or more from among a packet boundary, a block boundary and a lath boundary is 3 μm or less.

The method for manufacturing the low-alloy oil-well steel pipe according to the present invention includes a hot working step of hot-working a starting material having the above-described chemical composition to form a hollow shell, a final quenching step of subjecting the hollow shell to quenching in which a cooling rate for the hollow shell between 500° C. and 100° C. is set to PC/s to less than 15° C./s and the temperature of the hollow shell at which cooling is stopped is set to 100° C. or less; and a step of tempering the quenched hollow shell.

The above manufacturing method may further include an intermediate heat treatment step of soaking the hollow shell at a temperature of an $A_1$ point or more after the hot working step and before the final quenching step.

The low-alloy oil-well steel pipe according to the present invention and the method for manufacturing the same will be described in detail below.

[Chemical Composition]

The low-alloy oil-well steel pipe according to the present invention has the following chemical composition.

C: 0.40 to 0.65%

The low-alloy oil-well steel pipe according to the present invention has a carbon (C) content that is larger than those of the conventional low-alloy oil-well steel pipes. As a result of a large amount of C being contained, a large amount of fine carbides disperse in the steel and the strength of the steel is thereby enhanced. Examples of carbides include cementite and alloy carbides (e.g., Mo carbides, V carbides, Nb carbides and Ti carbides). Furthermore, the sub-structures are made finer and the SSC resistance thereby increases. If the C content is too low, the aforementioned effect cannot be obtained. On the other hand, if the C content is too high, the toughness of the steel in as-quenched condition decreases, resulting in an increase in quench cracking susceptibility. Therefore, the C content is 0.40 to 0.65%. The lower limit of the C content is preferably 0.50%, more preferably more than 0.50%, still more preferably 0.55%. The upper limit of the C content is preferably 0.62%, more preferably 0.60%.

Si: 0.05 to 0.50%

Silicon (Si) deoxidizes steel. If the Si content is too low, this effect cannot be achieved. On the other hand, if the Si content is too high, the SSC resistance decreases. Therefore, the Si content is 0.05 to 0.50%. The lower limit of the Si content is preferably 0.10%, more preferably 0.20%. The upper limit of the Si content is preferably 0.40%, more preferably 0.35%.

Mn: 0.10 to 1.00%

Manganese (Mn) deoxidizes steel. If the Mn content is too low, this effect cannot be achieved. On the other hand, if the Mn content is too high, Manganese is segregated on the grain boundaries together with impurity elements such as phosphorus (P) and sulfur (S). As a result, the SSC resistance of the steel decreases. Therefore, the Mn content is 0.10 to 1.00%. The lower limit of the Mn content is preferably 0.20%, more preferably 0.28%. The upper limit of the Mn content is preferably 0.80%, more preferably 0.50%.

P: 0.020% or Less

Phosphorus (P) is an impurity. Phosphorus is segregated on the grain boundaries and thereby decreases the SSC resistance of the steel. Thus, the P content is preferably as low as possible. Therefore, the P content is 0.020% or less. The P content is preferably 0.015% or less, more preferably 0.012% or less.

S: 0.0020% or Less

Sulfur (S) is an impurity as well as phosphorus. Sulfur is segregated on the grain boundaries and thereby decreases the SSC resistance of the steel. Thus, the S content is preferably as low as possible. Therefore, the S content is 0.0020% or less. The S content is preferably 0.0015% or less, more preferably 0.0010% or less.

Cu: 0.15% or Less

Copper (Cu) is an impurity. Copper embrittles steel and thereby decreases the SSC resistance of the steel. Thus, the Cu content is preferably as low as possible. Therefore, the Cu content is 0.15% or less. The upper limit of the Cu content is preferably less than 0.03%, more preferably 0.02%, still more preferably 0.01%.

Cr: 0.40 to 1.50%

Chromium (Cr) enhances the hardenability of steel and the strength of the steel. On the other hand, if an excessive amount of Cr is contained, the toughness of the steel decreases and the SSC resistance of the steel decreases. Therefore, the Cr content is 0.40 to 1.50%. The lower limit of the Cr content is preferably 0.45%. The upper limit of the Cr content is preferably 1.30%, more preferably 1.00%.

Mo: 0.50 to 2.50%

Molybdenum (Mo), as described above, forms carbides and thereby enhances the temper softening resistance, and consequently contributes to enhancement of the SSC resistance by high-temperature tempering. If the Mo content is too low, this effect cannot be achieved. On the other hand, the Mo content is too high, the above effect is saturated. Therefore, the Mo content is 0.50 to 2.50%. The lower limit of the Mo content is preferably 0.60%, more preferably 0.65%. The upper limit of the Mo content is 2.0%, more preferably 1.6%.

V: 0.05 to 0.25%

Vanadium (V), as described above, forms carbides and thereby enhances the temper softening resistance, and consequently contributes to enhancement of the SSC resistance by high-temperature tempering. If the V content is too low, this effect cannot be achieved. On the other hand, if the V content is too high, the toughness of the steel decreases. Therefore, the V content is 0.05 to 0.25%. The lower limit of the V content is preferably 0.07%. The upper limit of the V content is preferably 0.15%, more preferably 0.12%.

Nb: 0.01 to 0.2%

Niobium (Nb) combines with C and/or N to form carbides, nitrides or a carbo-nitrides. These precipitates (the carbides, the nitrides and the carbo-nitrides) subject the sub-structures of a steel to grain refinement by the pinning effect and thereby enhance the SSC resistance of the steel. If the Nb content is too low, this effect cannot be achieved. On the other hand, if the Nb content is too high, excess nitrides are produced and thereby destabilize the SSC resistance of the steel. Therefore, the Nb content is 0.01 to 0.2%. The lower limit of the Nb content is preferably 0.012%, more preferably 0.015%. The upper limit of the Nb content is preferably 0.10%, more preferably 0.05%.

sol. Al: 0.010 to 0.100%

Aluminum (Al) deoxidizes steel. If the Al content is too low, deoxidation of the steel is insufficient, resulting in a decrease in SSC resistance of the steel. On the other hand, if the Al content is too high, oxides are produced, resulting in a decrease in SSC resistance of the steel. Therefore, the Al content is 0.010 to 0.100%. The lower limit of the Al content is preferably 0.015%, more preferably 0.020%. The upper limit of the Al content is preferably 0.080%, more preferably 0.050%. In the present description, the content of "Al" means the content of "acid-soluble Al," that is, "sol. Al."

N: 0.006% or Less

Nitrogen (N) is an impurity. Nitrogen forms a nitride and thereby destabilizes the SSC resistance of the steel. Thus, the N content is preferably as low as possible. Therefore, the N content is 0.006% or less. The N content is preferably 0.005% or less, more preferably 0.004% or less.

The balance of the chemical composition of the low-alloy oil-well steel pipe is Fe and impurities. The impurities referred to herein are elements that are mixed in from ore and scrap used as steel raw materials or from, e.g., the environment in the manufacturing process.

[Regarding Optional Elements]

The low-alloy oil-well steel pipe may further contain Ti instead of a part of Fe.

Ti: 0 to Less than 0.01%

Titanium (Ti) is an optional element. Ti forms nitrides and thereby subjects the steel to grain refinement. Ti further suppresses surface cracking of a cast piece that are occasionally generated during continuous casting. During continuous casting, dissolved N combines with Al in a cast piece, Al nitrides precipitate due to strain induction. In this case, the surface of the cast piece becomes liable to crack. Ti preferentially combines with dissolved N to form Ti nitrides, and thereby suppress precipitation of Al nitrides. Thus, the surface cracking of the cast piece during the continuous casting is suppressed. Even if only a small amount of Ti is contained, these effects can be achieved. However, if the Ti content is too high, TiN coarsens and thereby destabilizes the SSC resistance of the steel. Therefore, the Ti content is 0 to less than 0.01%. The lower limit of the Ti content is preferably 0.001%, more preferably 0.003%. The upper limit of the Ti content is preferably 0.008%, more preferably 0.006%.

The low-alloy oil-well steel pipe may further contain B instead of a part of Fe.

B: 0 to 0.0015%

Boron (B) is an optional element. Boron enhances the hardenability, and enhances the strength of steel. Even if only a small amount of B is contained, the above effect can be achieved. However, if the B content is too high, $M_{23}CB_6$ is formed on the grain boundaries, resulting in a decrease in SSC resistance of the steel. Thus, a low B content is preferable even if B is contained. Therefore, the B content is 0 to 0.0015% or less. The lower limit of the B content is preferably 0.0003%, more preferably 0.0005%. The upper limit of the B content is preferably 0.0012%, more preferably 0.0010%.

The low-alloy oil-well steel pipe may further contain Ca instead of a part of Fe.

Ca: 0 to 0.003%

Calcium (Ca) is an optional element. Calcium combines with S in a steel to form sulfides, and thereby improves the shapes of inclusions and enhances the toughness of the steel. Even if only a small amount of Ca is contained, the above effect can be achieved. On the other hand, if the Ca content is too high, this effect is saturated. Therefore, the Ca content is 0 to 0.003%. The lower limit of the Ca content is preferably 0.0005%, more preferably 0.0010%. The upper limit of the Ca content is preferably 0.0025%, more preferably 0.0020%.

[Structure (Microstructure)]

The structure of the low-alloy oil-well steel pipe according to the present invention mainly includes tempered martensite. More specifically, the matrix in the structure consists of tempered martensite and 0 to less than 2% in volume ratio of retained austenite.

For the low-alloy oil-well steel pipe according to the present invention, the cooling rate in quenching is restricted from the perspective of quench cracking prevention because of the relatively-high C content in the steel. Thus, retained austenite may remain in the steel pipe after quenching. In the end product (state after tempering), retained austenite causes large variation of strength. Therefore, the volume ratio of retained austenite is preferably as low as possible. The volume ratio of retained austenite is preferably less than 1%. The low-alloy oil-well steel pipe according to the present invention has more preferably a structure consisting of tempered martensite, the volume ratio of retained austenite being 0%.

The volume ratio of retained austenite is measured as follows using X-ray diffractometry. A sample including a center part in the wall thickness of a produced oil-well steel pipe is collected. The surface of the collected sample is chemically polished. The chemically-polished surface is subjected to X-ray diffraction using a CoKα ray as an incident X ray. From the surface integrated intensities of the (211) surface, the (200) surface and the (110) surface of ferrite and the surface integrated intensities of the (220) surface, the (200) surface and the (111) surface of austenite, the volume ratio of retained austenite is determined and obtained.

[Grain Size of Prior-Austenite Grains]

The grain size number of the prior-austenite grains in the above structure is 9.0 or more. The grain size number of the prior-austenite grains referred to in the present description is measured in conformity of ASTM E112. If the grain size number of the prior-austenite grains is 9.0 or more, the steel exhibits excellent SSC resistance even if the steel has a yield strength of 965 MPa (140 ksi) or more. If the grain size number of the prior-austenite grains is less than 9.0, the steel has low SSC resistance where the steel has the aforementioned strength. The grain size number of the prior-austenite grains is preferably more than 9.0, more preferably 10.0 or more.

The grain size number of the prior-austenite grains may be measured using a steel product after quenching and before tempering (what is called as-quenched product) or may also be measured using a tempered steel product. Use of either of these steel products provides no change in size of the prior-austenite grains.

[Size of Sub-Structures]

As described above, tempered martensite contains a plurality of prior-austenite grains, a plurality of packets, a plurality of blocks and a plurality of laths. From among the regions of tempered martensite that are defined by the boundaries that are packet boundaries, block boundaries and lath boundaries, the equivalent circular diameter of a sub-structure surrounded by a boundary with a crystal orientation difference of 15° or more (high-angle grain boundary) is 3 μm or less.

The SSC resistance of a steel having a high strength of 965 MPa or more depends not only on the prior-austenite grain size but also on the sub-structure size. If the grain size number of the prior-austenite grains is 9.0 or more and the equivalent circular diameter of the sub-structures is 3 μm or less, a low-alloy oil-well steel pipe that has a high strength of 965 MPa or more and stably exhibits excellent SSC resistance can be provided. The equivalent circular diameter of the sub-structures is preferably 2.5 μm or less, more preferably 2.0 μm or less.

The equivalent circular diameter of the sub-structures is measured by the following method. A sample including an observation surface of 25 μm×25 μm with the center in the wall thickness as the center is collected from an arbitrary transverse surface of a low-alloy oil-well steel pipe (a surface perpendicular to the axial direction of the low-alloy oil-well steel pipe).

The observation surface is subjected to crystal orientation analysis by electron backscatter diffraction imaging (EBSP). Then, based on the results of the analysis, boundaries having a crystal orientation difference of 15° or more are drawn on the observation surface to identify a sub-structure.

The equivalent circular diameter of each of the specified sub-structures is measured. The equivalent circular diameter means a diameter of a circle where the area of the sub-structure is converted into a circle having the same area. The equivalent circular diameter can be measured by, for example, employing method of measuring the mean intercept length of crystal grains defined in JIS G 0551 to obtain mean grain size. The average of the obtained equivalent circular diameters of the respective sub-structures is defined as the equivalent circular diameter of the sub-structures referred to in the present description.

Figure 2:
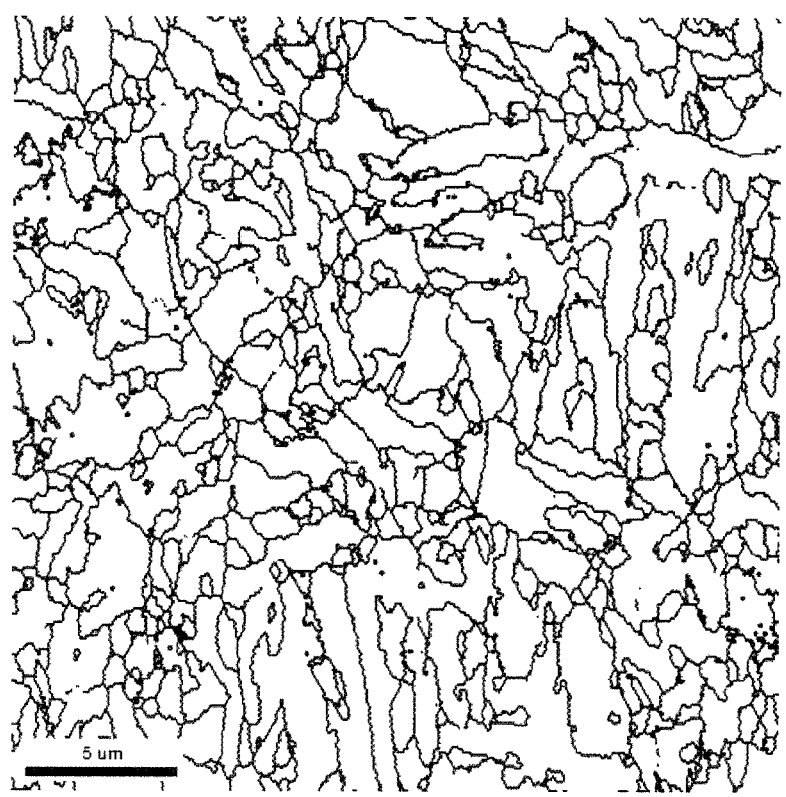
FIG. 2 illustrates a high-angle grain boundary map of a structure whose sub-structures have a grain diameter of 2.6 μm.

FIGS. 1 and 2 each illustrate an example structure whose equivalent circular diameter of the sub-structures is 2.6 μm. FIG. 1 is a prior-austenite grain boundary map, and FIG. 2 is a high-angle grain boundary map. The structure is one obtained from a steel having a prior-austenite grain size number of 10.5 and containing C: 0.51%, Si: 0.31%, Mn: 0.47%, P: 0.012%, S: 0.0014%, Cu: 0.02%, Cr: 1.06%, Mo: 0.67%, V: 0.098%, Ti: 0.008%, Nb: 0.012%, Ca: 0.0018%, B: 0.0001%, sol. Al: 0.029% and N: 0.0034%, the balance being Fe and impurities.

Figure 3:
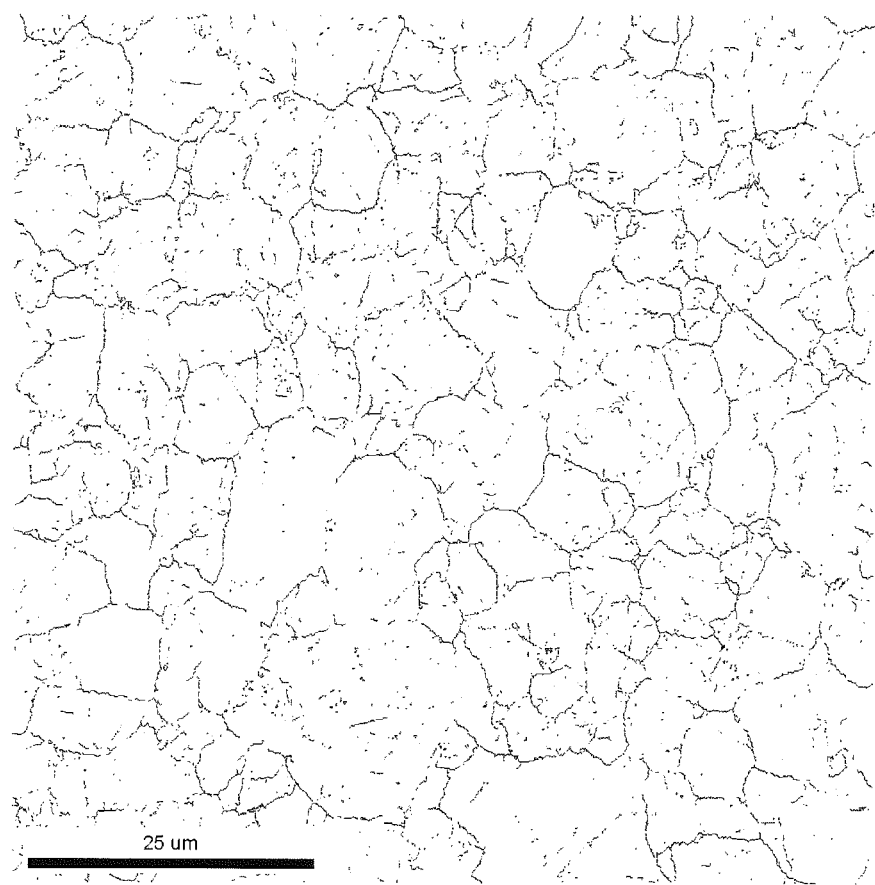
FIG. 3 illustrates a prior-austenite grain boundary map of a structure whose sub-structures have a grain diameter of 4.1 μm.
Figure 4:
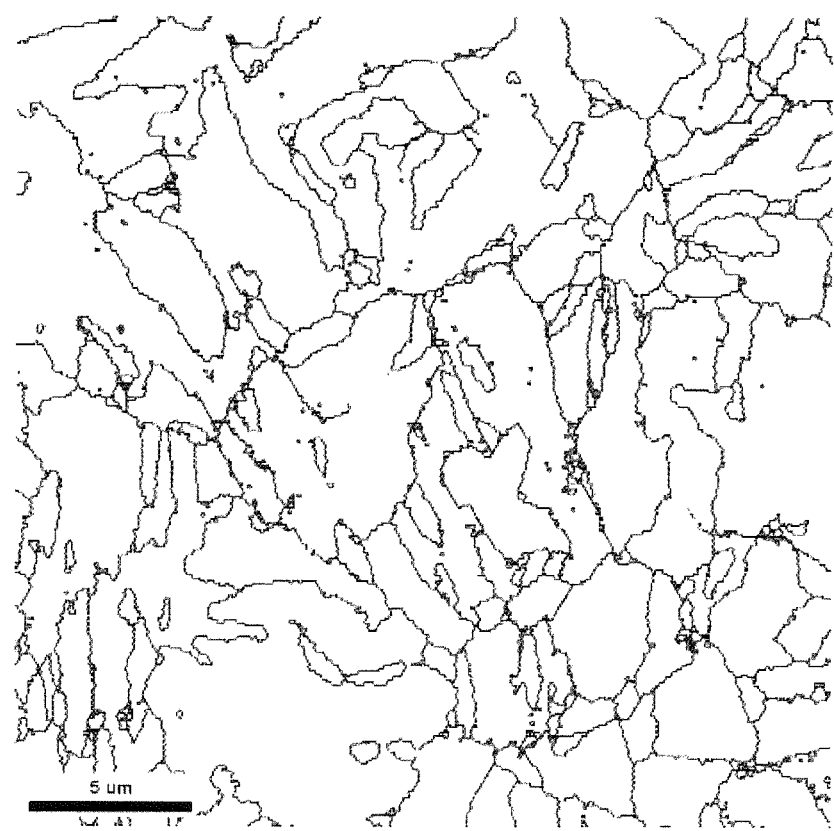
FIG. 4 is a high-angle grain boundary map of a structure whose sub-structures have a grain diameter of 4.1 μm.

FIGS. 3 and 4 each illustrate an example structure whose grain diameter of the sub-structures is 4.1 μm. FIG. 3 is a prior-austenite grain boundary map, and FIG. 4 is a high-angle grain boundary map. The structure is one obtained from a steel having a prior-austenite grain size number of 11.5 and containing C: 0.26%, Si: 0.19%, Mn: 0.82%, P: 0.013%, S: 0.0008%, Cu: 0.01%, Cr: 0.52%, Mo: 0.70%, V: 0.11%, Ti: 0.018%, Nb: 0.013%, Ca: 0.0001%, B: 0.0001%, sol. Al: 0.040% and N: 0.0041%, the balance being Fe and impurities.

[Yield Strength]

The low-alloy oil-well steel pipe according to the present invention has yield strength of 965 MPa or more (140 ksi or more). The yield strength is defined based on the 0.2% yield stress. Although the upper limit of the yield strength is not specifically limited, the upper limit of the yield strength is, for example, 1150 MPa.

[Yield Ratio]

The low-alloy oil-well steel pipe according to the present invention, which has the above-described chemical composition and structure, has yield ratio YR (=yield strength YS/tensile strength TS) of 0.90 or more. If the yield ratio YR is less than 0.90, a phase other than tempered martensite (for example, bainite) is contained in the structure. In this case, the SSC resistance decreases. The yield ratio YR of the low-alloy oil-well steel pipe according to the present invention is 0.90 or more, and the structure consists of the single phase of tempered martensite, or tempered martensite and 0 to less than 2% of retained austenite. Thus, the low-alloy oil-well steel pipe according to the present invention has high yield strength (965 MPa or more) as well as excellent SSC resistance.

[Manufacturing Method]

An example of the low-alloy oil-well steel pipe manufacturing method according to the present invention will be described. In this example, a seamless steel pipe (low-alloy oil-well steel pipe) manufacturing method will be described.

A steel having the above-described chemical composition is melted and refined by a well-known method. Subsequently, the molten steel is made into a continuously-casted material by the continuous casting process. The continuously-casted material may be, for example, a slab, a bloom or a billet. Also, the molten steel may be made into an ingot by the ingot-making process.

The slab, the bloom or the ingot is hot-worked into a billet. The billet may be formed by hot rolling or hot forging.

The billet is hot-worked to produce a hollow shell. First, the billet is heated in a heating furnace. The billet extracted from the heating furnace is subjected to hot working to produce a hollow shell (seamless steel pipe). For example, the Mannesmann process is performed as the hot working to produce a hollow shell. In this case, a round billet is piercing-rolled using a piercing machine. The piercing-rolled round billet is further hot-rolled into a hollow shell using, e.g., a mandrel mill, a reducer or a sizing mill. The hollow shell may be produced from the billet by another hot working process.

The hot-worked hollow shell is subjected to quenching by at least one reheating, and tempering.

A quenching temperature in quenching is a well-known temperature (temperature of an $A_{C3}$ point or more). The upper limit of the quenching temperature is preferably 900° C. or less. In this case, the prior-austenite grains are further made finer.

Quenching may be performed once or a plurality of times. A hollow shell temperature at which cooling during final quenching (that is, cooling stop temperature) is stopped is 100° C. or less. If the cooling stop temperature is higher than 100° C., the equivalent circular diameter of the sub-structures becomes larger than 3 μm.

Furthermore, in the final quenching, the cooling rate when the hollow shell temperature is between 500° C. and 100° C. is set to 1° C./s to less than 15° C./s. If the cooling rate for the aforementioned temperature range is less than 1° C./s, the equivalent circular diameter of the sub-structures becomes larger than 3 μm. Furthermore, in the structure, not only martensite but also bainite is produced. On the other hand, if the cooling rate is 15° C./s or more, quench cracking is liable to occur. If the cooling rate when the hollow shell temperature is between 500° C. and 100° C. is 1° C./s to less than 15° C./s, the equivalent circular diameter of the sub-structures becomes 3.0 μm or less and quench cracking is less liable to occur. The lower limit of the cooling rate is preferably 2° C./s, more preferably 3° C./s.

After the final quenching is performed, tempering is performed at a tempering temperature of less than the A° point. The tempering temperature is arbitrarily adjusted according to the chemical composition of the hollow shell and the intended yield strength. The tempering temperature is preferably 650° C. to 700° C., and the soaking period for the tempering temperature is preferably 15 to 120 minutes. The volume ratio of retained austenite can also be reduced by adjusting the tempering temperature. As a result of the tempering, the yield strength of the hollow shell becomes 965 MPa or more. Quenching and tempering may be performed a plurality of times.

The low-alloy oil-well steel pipe according to the present invention is produced by the above-described manufacturing process.

[Intermediate Heat Treatment Process]

In the above-described manufacturing method, quenching is performed after hot working. However, another heat treatment (intermediate heat treatment) may be performed after hot working.

For example, the hot-worked hollow shell may be subjected to normalizing. More specifically, the hot-worked hollow shell is held at a temperature that is higher than an $A_3$ point (for example, 850° C. to 950° C.) for a given period of time and then allowed to cool naturally. The holding period is, for example, 15 to 120 minutes. For normalizing, generally, after hot working, the hollow shell is cooled to normal temperature and then heated to the $A_{C3}$ point or more. However, in the present invention, normalizing may be performed by holding the hollow shell as it is at a temperature of the $A_{C3}$ point or more after hot working.

If normalizing is performed, the grains (prior-austenite grains) of the steel are further refined. More specifically, if the normalized hollow shell is quenched, the grain size number of the prior-austenite grains of the as-quenched material becomes 10.0 or more.

Also, instead of the above-described normalizing, quenching may be performed. In this case, as described above, quenching is performed a plurality of times.

Also, the intermediate heat treatment provides an effect similar to the above even if it is a heat treatment in a temperature range of two phases, ferrite+austenite (hereinafter referred to as "two-phase range heating"). In the intermediate heat treatment, if at least a part of the structure of the steel is transformed to austenite, an effect that is favorable for grain refining can be achieved. Accordingly, in the intermediate heat treatment, it is preferable that at least the hollow shell be soaked at a temperature of the $A_{c1}$ point or more.

If the intermediate heat treatment is performed before the final quenching, the prior-austenite grains are further refined and the SSC resistance is further enhanced.

As described above, the cooling stop temperature in the final quenching is set to 100° C. or less and the cooling rate when the hollow shell temperature is between 500° C. and 100° C. is set to PC/s to less than 15° C./s, whereby the grain size number of the prior-austenite grains become 9.0 or more and the equivalent circular diameter of the sub-structures become 3.0 μm or less. Thus, a low-alloy oil-well steel pipe that has yield strength of 965 MPa or more and stably exhibits excellent SSC resistance can be provided.

Example

Ingots of steels A to K having the respective chemical compositions indicated in Table 1 were produced.

TABLE 1

| | Chemical composition (unit: mass %, balance being Fe and impurities) | | | | | | | | | | | | | | |
|---|---|---|---|---|---|---|---|---|---|---|---|---|---|---|---|
| Steel | C | Si | Mn | P | S | Cu | Cr | Mo | V | Ti | Nb | sol-Al | B | N | Ca |
| A | 0.51 | 0.25 | 0.43 | 0.013 | 0.0015 | 0.01 | 0.53 | 1.10 | 0.09 | — | 0.032 | 0.035 | — | 0.0027 | — |
| B | 0.47 | 0.35 | 0.40 | 0.012 | 0.0014 | 0.02 | 0.61 | 1.20 | 0.08 | — | 0.031 | 0.041 | — | 0.0035 | 0.0008 |
| C | 0.51 | 0.31 | 0.47 | 0.012 | 0.0014 | 0.02 | 1.06 | 0.67 | 0.10 | 0.004 | 0.012 | 0.029 | 0.0001 | 0.0034 | 0.0018 |
| D | 0.59 | 0.20 | 0.45 | 0.011 | 0.0010 | 0.01 | 1.00 | 0.70 | 0.10 | 0.005 | 0.029 | 0.038 | 0.0001 | 0.0039 | — |
| E | 0.50 | 0.10 | 0.40 | 0.010 | 0.0010 | 0.01 | 1.28 | 0.74 | 0.24 | 0.003 | 0.038 | 0.035 | — | 0.0026 | 0.0015 |
| F | 0.62 | 0.23 | 0.35 | 0.009 | 0.0008 | 0.02 | 0.51 | 0.73 | 0.08 | 0.003 | 0.034 | 0.041 | — | 0.0032 | — |
| G | 0.51 | 0.31 | 0.47 | 0.012 | 0.0014 | 0.02 | 0.57 | 1.51 | 0.10 | 0.003 | 0.028 | 0.029 | 0.0002 | 0.0034 | — |
| H | 0.55 | 0.28 | 0.43 | 0.006 | 0.0010 | 0.02 | 0.50 | 0.73 | 0.09 | 0.005 | 0.029 | 0.032 | 0.0001 | 0.0038 | 0.0013 |
| I | 0.28* | 0.19 | 0.45 | 0.013 | 0.0008 | 0.01 | 0.52 | 0.70 | 0.11 | 0.006 | 0.032 | 0.040 | 0.0001 | 0.0041 | 0.0001 |
| J | 0.51 | 0.25 | 0.50 | 0.012 | 0.0013 | 0.02 | 0.67 | 1.10 | 0.10 | 0.014* | 0.031 | 0.051 | — | 0.0039 | — |
| K | 0.53 | 0.25 | 1.10* | 0.012 | 0.0007 | 0.02 | 0.90 | 0.69 | 0.08 | — | 0.031 | 0.032 | — | 0.0044 | 0.0012 |

*indicates that the relevant content falls out of the scope of the claims of the present application.

The symbol "-" in Table 1 indicates that the content is substantially "0"%. Referring to Table 1, the chemical compositions of steels A to H were ones falling within the scope of the present invention. On the other hand, the C content in steel I was less than the lower limit of the C content in the present invention. The Ti content in the steel J was more than the upper limit of the Ti content in the present invention. The Mn content in steel K was more than the upper limit of the Mn content in the present invention.

After the respective ingots were heated, seamless steel pipes each having an outer diameter of 244.5 mm and a wall thickness of 13.8 mm were produced by hot working (piercing-rolling). The seamless steel pipes were subjected to the intermediate heat treatment and the final quenching by reheating the pipes to the temperatures indicated in Table 2.

TABLE 2

| Number | Steel | Intermediate heat treatment | | | Final quenching | | | | Prior-γ grain size number |
|---|---|---|---|---|---|---|---|---|---|
| | | Type | Heat treatment temperature (° C.) | Cooling method | Quenching temperature (° C.) | Cooling method | Cooling rate (° C./s) | Cooling stop temperature (° C.) | |
| 1 | A | — | — | — | 890 | Mist spray | 5 | 75° C. | 9.0 |
| 2 | A | Normalizing | 920 | natural cooling | 890 | Mist spray | 5 | 75° C. | 10 |
| 3 | A | Quenching | 920 | Mist spray | 890 | Mist spray | 5 | 75° C. | 11 |
| 4 | A | Two-phase range heating | 800 | natural cooling | 890 | Mist spray | 5 | 75° C. | 10 |
| 5 | A | Quenching | 920 | Mist spray | 890 | Mist spray | 5 | 150° C.* | 11 |
| 6 | B | Quenching | 920 | Mist spray | 890 | Mist spray | 5 | 65° C. | 11 |
| 7 | B | Quenching | 920 | Oil tank immersion | 890 | Oil tank immersion | 3 | 65° C. | 11 |
| 8 | C | Normalizing | 920 | natural cooling | 890 | Mist spray | 5 | 75° C. | 10 |
| 9 | D | — | — | — | 890 | Oil tank immersion | 3 | 85° C. | 9.5 |
| 10 | D | Normalizing | 920 | natural cooling | 890 | Mist spray | 2 | 75° C. | 10 |
| 11 | D | Normalizing | 920 | natural cooling | 890 | Mist spray | 5 | 135° C.* | 10 |
| 12 | E | Quenching | 920 | Oil tank immersion | 890 | Oil tank immersion | 2 | 85° C. | 11 |
| 13 | F | Normalizing | 920 | natural cooling | 890 | Mist spray | 3 | 65° C. | 10.5 |
| 14 | G | Normalizing | 920 | natural cooling | 910 | Mist spray | 5 | 75° C. | 10.5 |
| 15 | H | — | — | — | 850 | Mist spray | 5 | 75° C. | 9.5 |
| 16 | H | Quenching | 920 | Mist spray | 850 | Mist spray | 5 | 50° C. | 11.5 |
| 17 | H | Normalizing | 920 | natural cooling | 890 | Mist spray | 3 | 50° C. | 10.5 |
| 18 | I* | Quenching | 920 | Water tank immersion | 890 | Water tank immersion | 20* | 50° C. | 10.5 |
| 19 | J* | Normalizing | 920 | natural cooling | 890 | Mist spray | 5 | 65° C. | 10 |
| 20 | K* | Normalizing | 920 | natural cooling | 850 | Mist spray | 5 | 50° C. | 11.5 |
| 21 | C | Normalizing | 920 | natural cooling | 890 | Mist spray | 20* | 65° C. | 10 |
| 22 | C | Normalizing | 920 | natural cooling | 890 | Mist spray | 0.8* | 65° C. | 10 |

*indicates that the relevant steel or value falls out of the scope of the claims of the present application.

The "Intermediate heat treatment" column in Table 2 indicates the contents of intermediate heat treatments performed for hot-worked seamless steel pipes of the respective test numbers. More specifically, the "Type" column in the "Intermediate heat treatment" column indicates the type of the heat treatment performed (normalizing, two-phase region heating or quenching). For example, in the case of number 2, it is indicated that normalizing was performed at a heat treatment temperature of 920° C. as the intermediate heat treatment and the cooling method was natural cooling. In the case of number 3, it is indicated that quenching was performed at a quenching temperature of 920° C. and forced-cooling was performed using mist spray. In the case of number 4, it is indicated that the relevant seamless steel pipe was heated to a temperature that is the $A_{c1}$ point or more and then allowed to cool naturally, in the case of number 7, it is indicated that the hollow shell is immersed in an oil tank in quenching for reinforced-cooling, and in the case of number 18, it is indicated that the hollow shell is immersed in a water tank for reinforced-cooling.

The "Final quenching" column in Table 2 indicates the contents of final quenching performed for the seamless steel pipe of the respective test numbers, which have been subjected to the respective intermediate heat treatments. More specifically, the "Cooling rate" column indicates the cooling rates (° C./s) when the temperatures of the respective seamless steel pipes were between 500° C. and 100° C.

In Table 2, the symbol "—" in the "Intermediate heat treatment" column indicates that no intermediate heat treatment was performed for the relevant number.

[Prior-Austenite Grain Size Test]

Using the seamless steel pipes (as-quenched products) subjected to the final quenching, a prior-austenite grain size test was conducted. More specifically, samples were collected by cutting the as-quenched products in the wall thickness direction. Then, the samples were embedded in resin, and a surface of each sample that corresponds to the cut surface perpendicular to the axial direction of the seamless steel pipe (hereinafter referred to as observation surface)

was etched using picric acid. The etched observation surface was observed and the grain size number of the prior-austenite grains was determined in conformity of ASTM E112.

[Tempering]

The seamless steel pipes subjected to the final quenching were subjected to tempering at the respective tempering temperatures (° C.) for the soak period (minutes) indicated in Table 3 to adjust the seamless steel pipes of the respective numbers to have a yield strength of 965 MPa (140 ksi) or more.

In each of numbers 1 to 21, the microstructure was a structure consisting of tempered martensite or tempered martensite and retained austenite. In number 22, a bainite structure was observed.

By means of the aforementioned X-ray diffractometry, the volume ratio (%) of the retained austenite in each steel was measured. More specifically, a sample including a center part in the wall thickness of each seamless steel pipe was collected. The surfaces of the collected sample were chemically polished. The chemically-polished surface was subjected to X-ray diffraction using a CoKα ray as an incident

TABLE 3

| Number | Steel | Structure | Retained γ grain ratio (%) | Prior-γ grain size number | Tempering Temperature (° C.) | Soaking period (min) | Metal structure Sub-structure Equivalent circular diameter (mm) | Tensile characteristics YS (MPa) | TS (MPa) | YR | SSC resistance test First | Second | Third |
|---|---|---|---|---|---|---|---|---|---|---|---|---|---|
| 1 | A | M | 0.2 | 9.0 | 670 | 60 | 2.8 | 1005 | 1100 | 0.91 | NF | NF | NF |
| 2 | A | M | 0.1 | 10 | 670 | 60 | 2.4 | 1040 | 1120 | 0.93 | NF | NF | NF |
| 3 | A | M | 0.1 | 11 | 670 | 60 | 2.2 | 1050 | 1115 | 0.94 | NF | NF | NF |
| 4 | A | M | 0.1 | 11 | 670 | 60 | 2.2 | 1045 | 1120 | 0.93 | NF | NF | NF |
| 5 | A | M | 1.0 | 11 | 660 | 60 | 3.5* | 1020 | 1150 | 0.89 | F | F | F |
| 6 | B | M | 0 | 11 | 670 | 60 | 1.8 | 1100 | 1150 | 0.96 | NF | NF | NF |
| 7 | B | M | 0 | 11 | 670 | 60 | 2.0 | 1110 | 1145 | 0.97 | NF | NF | NF |
| 8 | C | M | 0 | 10 | 670 | 60 | 2.5 | 1035 | 1125 | 0.92 | NF | NF | NF |
| 9 | D | M | 0.1 | 9.5 | 670 | 60 | 2.7 | 1000 | 1100 | 0.91 | NF | NF | NF |
| 10 | D | M | 0.1 | 10 | 670 | 60 | 2.2 | 1050 | 1160 | 0.91 | NF | NF | NF |
| 11 | D | M | 0.5 | 10 | 675 | 60 | 3.6* | 1035 | 1165 | 0.89 | F | F | F |
| 12 | E | M | 0.1 | 11 | 700 | 60 | 2.9 | 1045 | 1160 | 0.90 | NF | NF | NF |
| 13 | F | M | 0.3 | 10.5 | 670 | 60 | 1.7 | 1105 | 1160 | 0.95 | NF | NF | NF |
| 14 | G | M | 0.1 | 10.5 | 670 | 60 | 2.2 | 1075 | 1170 | 0.92 | NF | NF | NF |
| 15 | H | M | 0.2 | 9.5 | 670 | 60 | 2.8 | 1015 | 1130 | 0.90 | NF | NF | NF |
| 16 | H | M | 0 | 11.5 | 670 | 60 | 1.7 | 1120 | 1190 | 0.94 | NF | NF | NF |
| 17 | H | M | 0.1 | 10.5 | 670 | 60 | 1.9 | 1110 | 1190 | 0.93 | NF | NF | NF |
| 18 | I* | M | 0.1 | 10.5 | 650 | 60 | 4.0* | 1000 | 1085 | 0.92 | F | F | F |
| 19 | J* | M | 0 | 10 | 680 | 60 | 2.7 | 1020 | 1090 | 0.94 | NF | F | F |
| 20 | K* | M | 0.1 | 11.5 | 670 | 60 | 2.5 | 1035 | 1125 | 0.92 | NF | F | F |
| 21 | C | M | — | 10 | No subsequent processes performed because of occurrence of quench cracking | | | | | | | | |
| 22 | C | B | 0.2 | 10 | 670 | 60 | 4.2* | 1005 | 1150 | 0.87 | F | F | F |

*indicates that the relevant steel or value falls out of the scope of the claims of the present application.

[Evaluation Test for Seamless Steel Pipes Subjected to Tempering]
[Microstructure Observation Test and Retained Austenite Volume Ratio Measurement Test]

The following microstructure observation test was conducted for the seamless steel pipe of each number, which has been subjected to tempering. A center part in the wall thickness of a transverse cross-section of each seamless steel pipe (surface perpendicular to the axial direction of the seamless steel pipe) was etched using nital. Three arbitrary visual fields (each having an area of 100 μm×100 μm) in the etched center part in the wall thickness were observed. For the observation, a scanning electronic microscope (SEM) was used. As a result of the etching, tempered martensite was confirmed.

The results of the microstructure observation are indicated in Table 3. The symbol "M" in the Table means that the microstructure of the relevant number consists of tempered martensite or tempered martensite and retained austenite. The symbol "B" in the Table means that the microstructure of the relevant number is a bainite structure.

X ray. Form the surface integrated intensities of the (211) surface, the (200) surface and the (110) surface of ferrite and the surface integrated intensities of the (220) surface, the (200) surface and the (111) surface of austenite, the volume ratio (%) of retained austenite was determined.

The results of the determination are indicated in Table 3. In each of the numbers, the volume ratio of retained austenite was less than 2%.

[Test for Measurement of Equivalent Circular Diameter of Sub-Structures]

The seamless steel pipe of each number, which has been subjected to tempering, was subjected to crystal orientation analysis using EBSP by the above-described method to obtain the equivalent circular diameter of the sub-structures.

[Yield Stress Test]

From each of the seamless steel pipes subjected to tempering, a round-bar tension test specimen having a parallel part measuring 6 mm in outer diameter and 40 mm in length was collected. The parallel part was parallel to the axial direction of the seamless steel pipe. Using each of the collected round-bar tension test specimens, a tension test was conducted at normal temperature (25° C.) to obtain the yield strength YS (0.2% proof stress) (MPa) and the tensile strength TS (MPa). As a result, as indicated in Table 3, the yield strength was 965 MPa (140 ksi) or more in each of the numbers.

[SSC Resistance Test]

The following constant-load tension test was performed for the seamless steel pipe of each number. From the seamless steel pipe of each number, three round-bar tension test specimens each including a parallel part extending in the axial direction were collected. The parallel part of each round-bar tension test specimen measured 6.35 mm in outer diameter and 25.4 mm in length. A constant load tension test was conducted at normal temperature (24° C.) in a test bath based on the NACE TM0177 A method. For the test bath, an aqueous solution of 5% of NaCl+0.5% of $CH_3COOH$ charged with a hydrogen sulfide gas of 0.1 bar (the balance being $CO_2$ gas) was used. Under the condition of pH3.5, a constant load that is 90% of the yield strength measured in the tension test was imposed on each of the test specimens (three in total) in the test bath. It was determined that no SSC occurred if the test specimen did not break off even after the passage of 720 hours, and it was determined that SSC occurred if the test specimen broken off during the test (that is, within 720 hours).

[Test Results]

Table 3 indicates the test results. The symbol "NF" in the "SSC resistance test" column in Table 3 indicates that the relevant test specimen did not break off even after the passage of 720 hours (that is, no SSC occurred). The symbol "F" indicates that the relevant test specimen broke off during the test (that is, SSC occurred).

In each of numbers 1 to 4, 6 to 10 and 12 to 17, the chemical composition of the starting material was within the scope of the present invention and the production conditions (the cooling rate and the cooling stop temperature in the final quenching) were proper. Thus, the structure consisted of tempered martensite and 0 to less than 2% of retained austenite, and the grain size number of the prior-austenite grains was 9.0 or more. Furthermore, the equivalent circular diameter of the sub-structures was 3.0 μm or less. Furthermore, the yield ratio YR was 0.90 or more. Thus, in the SSC resistance test, none of the three test specimens broke off and excellent SSC resistance was stably obtained.

In particular, in each of numbers 2 to 4, 6 to 8, 10, 12 to 14, 16 and 17, normalizing, quenching or two-phase range heating was performed as the intermediate heat treatment. Thus, the grain size number of the prior-austenite grains of the seamless steel pipe of each of these numbers was 10.0 or more, which is higher than those of numbers 1, 9 and 15 in which no intermediate heat treatment was performed.

On the other hand, in each of numbers 5 and 11, although the chemical composition of the starting material and the cooling rate in the final quenching were proper, the cooling stop temperature was more than 100° C. Thus, the equivalent circular diameter of the sub-structures was more than 3.0 μm, and in the SSC resistance test, all of the three test specimens broke off.

In number 18, the C content in the starting material was too low. Furthermore, the cooling rate in the final quenching was more than 15° C./s. Since the C content was low, no quench cracking occurred, but the equivalent circular diameter of the sub-structures was more than 3.0 and in the SSC resistance test, all of the three test specimens broke off.

In number 19, the Ti content in the starting material was too high. Thus, in the SSC resistance test, two of the three test specimens broke off and the SSC resistance was unstable.

In number 20, the Mn content in the starting material was too high. Thus, in the SSC resistance test, two of the three test specimens broke off and the SSC resistance was unstable.

In number 21, although the chemical composition of the starting material was within the scope of the present invention, the cooling rate in the final quenching was too high. Thus, quench cracking occurred.

In number 22, although the chemical composition of the starting material was within the scope of the present invention, the cooling rate in the final quenching was too low. Thus, the structure becomes a bainite structure, and the yield ratio YR was less than 0.90. Thus, in the SSC resistance test, all of the three test specimens broke off.

Although the embodiment of the present invention has been described above, the above-described embodiment is a mere illustration for carrying out the present invention. Therefore, the present invention is not limited to the embodiment, and the present invention can be carried out with the embodiment arbitrarily modified without departing from the spirit of the embodiment.

The invention claimed is:

1. A low-alloy oil-well steel pipe characterized by comprising:
a chemical composition consisting, in mass %, of
C: 0.40 to 0.65%,
Si: 0.05 to 0.50%,
Mn: 0.10 to 1.00%,
P: 0.020% or less,
S: 0.0020% or less,
Cu: 0.15% or less,
Cr: 0.40 to 1.50%,
Mo: 0.50 to 2.50%,
V: 0.05 to 0.25%,
Ti: 0 to less than 0.01%,
Nb: 0.01 to 0.2%,
sol. Al: 0.010 to 0.100%,
N: 0.006% or less,
B: 0 to 0.0015%, and
Ca: 0 to 0.003%,
the balance being Fe and impurities; and
a structure consisting of tempered martensite and 0 to less than 2% in volume ratio of retained austenite,
wherein the steel pipe has yield strength of 965 MPa or more;
wherein a grain size number of a prior-austenite grain in the structure is 9.0 or more; and
wherein in the tempered martensite, a equivalent circular diameter of a sub-structure surrounded by a boundary having a crystal orientation difference of 15° or more from among a packet boundary, a block boundary and a lath boundary is 3 μm or less.

2. A method for manufacturing a low-alloy oil-well steel pipe, which has a yield stress of 965 MPa or more, comprising:
a hot working step of hot-working a starting material having the chemical composition according to claim 1 to form a hollow shell;
a final quenching step of subjecting the hollow shell to quenching in which a cooling rate when a temperature of the hollow shell is between 500° C. and 100° C. is set to 1° C./s to less than 15° C./s and the temperature of the hollow shell at which cooling is stopped is set to 100° C. or less; and a step of tempering the quenched hollow shell.

3. The method according to claim 2, characterized in that the method further comprises an intermediate heat treatment step of soaking the hollow shell at a temperature of an $A_1$ point or more after the hot working step and before the final quenching step.

* * * * *